United States Patent [19]
Holmdahl et al.

[11] Patent Number: 5,754,890
[45] Date of Patent: May 19, 1998

[54] SYSTEM FOR AUTOMATIC IDENTIFICATION OF A COMPUTER DATA ENTRY DEVICE INTERFACE TYPE USING A TRANSISTOR TO SENSE THE VOLTAGE GENERATED BY THE INTERFACE AND OUTPUT A MATCHING VOLTAGE LEVEL

[75] Inventors: Todd E. Holmdahl, Bothell; Glade B. Bacon, Everett, both of Wash.

[73] Assignee: Microsoft Corporation, Redmond, Wash.

[21] Appl. No.: 595,345

[22] Filed: Feb. 1, 1996

[51] Int. Cl.$^6$ ............................................. G06F 13/00
[52] U.S. Cl. ................... 395/883; 395/326; 395/831; 395/836; 395/893; 307/36; 307/112; 307/139; 307/143
[58] Field of Search ................... 307/139, 36, 112, 307/143; 341/100; 375/377; 395/326, 829, 836, 831, 838, 893

[56] References Cited

U.S. PATENT DOCUMENTS

| | | | |
|---|---|---|---|
| 4,607,379 | 8/1986 | Marshall, Jr. et al. | 375/377 |
| 4,686,506 | 8/1987 | Farago | 341/100 |
| 5,121,482 | 6/1992 | Patton | 395/836 |
| 5,258,655 | 11/1993 | May et al. | 307/139 |
| 5,278,958 | 1/1994 | Dewa | 395/836 |
| 5,301,270 | 4/1994 | Steinberg et al. | 395/326 |
| 5,457,784 | 10/1995 | Wells et al. | 395/829 |
| 5,530,895 | 6/1996 | Enstrom | 395/829 |

*Primary Examiner*—Thomas C. Lee
*Assistant Examiner*—Po C. Huang
*Attorney, Agent, or Firm*—Seed and Berry LLP

[57] ABSTRACT

A circuit using a single transistor to detect the interface type to Which a combination pointing device is connected. The pointing device may be connected to a PS/2 interface, which generates a voltage greater than or equal to 0 volts, or a serial interface which generates a negative voltage. The transistor is activated when connected to the serial interface, and is inactive when connected to the PS/2 interface. The output of the transistor is sensed by a microcontroller within the pointing device. The microcontroller generates data for transmission to the PS/2 interface if the transistor is not active, and generates data for transmission to the serial interface if the transistor is active. An I/O pin in the microcontroller is used to sense the interface type and can also be used as an output in which the microcontroller generates control signals for use by the pointing device. This multitasking operation reduces the required pin count of the microcontroller, thus reducing cost.

36 Claims, 5 Drawing Sheets

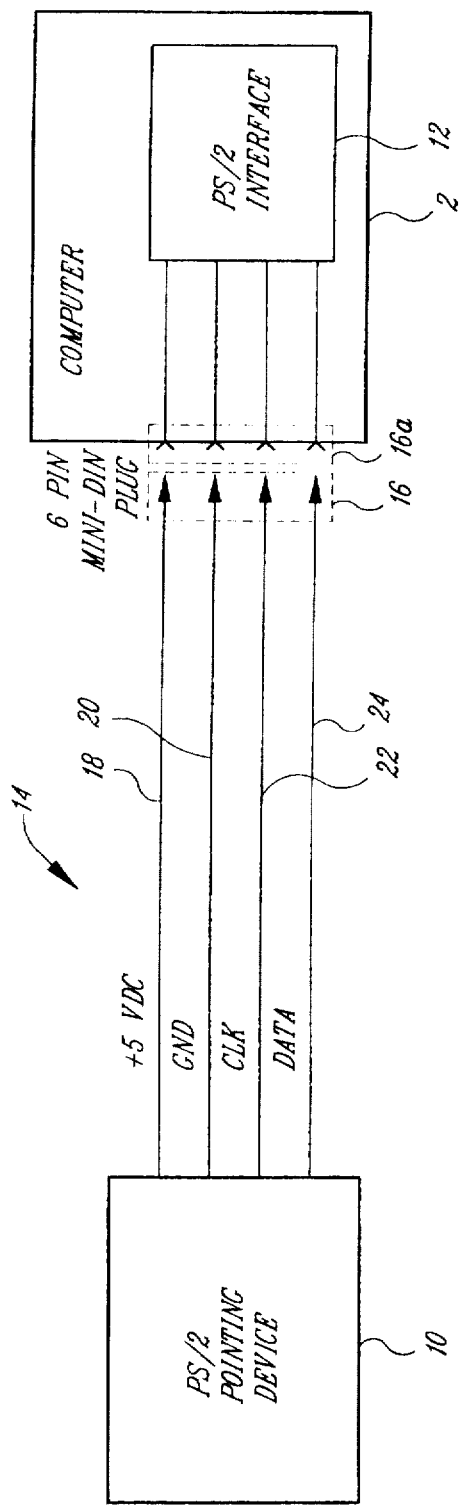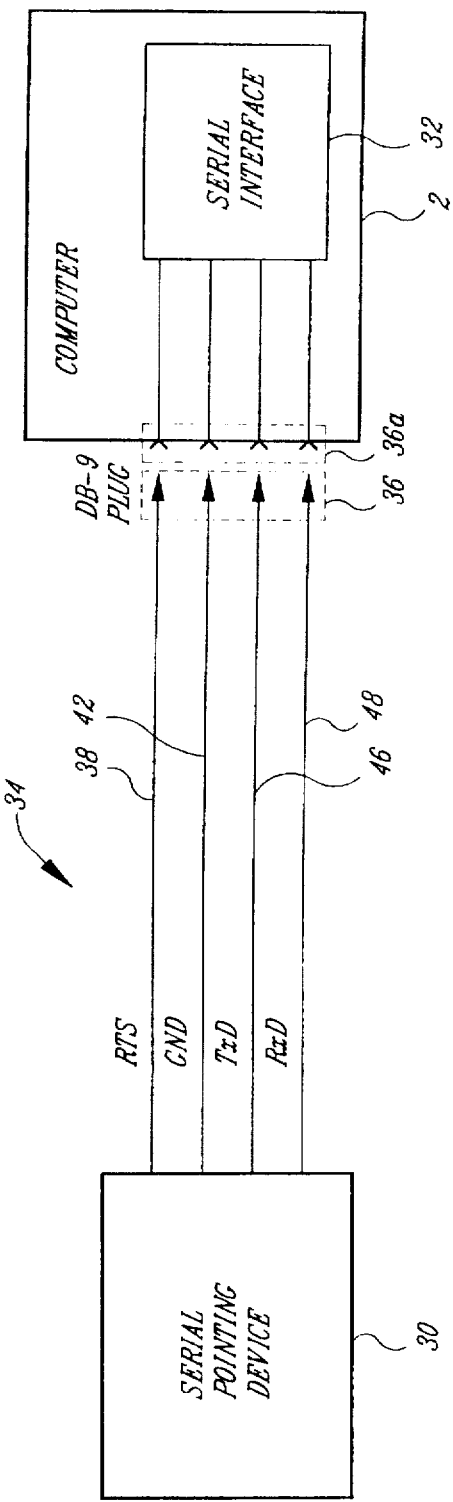

5,754,890

1

SYSTEM FOR AUTOMATIC IDENTIFICATION OF A COMPUTER DATA ENTRY DEVICE INTERFACE TYPE USING A TRANSISTOR TO SENSE THE VOLTAGE GENERATED BY THE INTERFACE AND OUTPUT A MATCHING VOLTAGE LEVEL

TECHNICAL FIELD

The present invention relates generally to computer pointing devices, and, more specifically, to a system and method for automatic identification of a computer pointing device interface.

BACKGROUND OF THE INVENTION

Computers are used in many applications. To position a cursor on a computer display and/or to enter commands, a computer pointing device is typically used. Pointing devices have been developed for two different interface types within the host computer. Until recently, both interface types required a specialized computer pointing device. For example, a pointing device such as a mouse was introduced in a version operable with a RS-232 interface on the computer, and also in a separate version operable with a PS/2 or mouse port interface on the computer. Subsequently, combination pointing devices, capable of operation with more than one type of interface, were introduced. However, the combination pointing devices must have the capability of identifying the type of interface to which they are connected. Therefore, it can be appreciated that there is a significant need for a combination computer pointing device that automatically identifies the interface type. The present invention provides this and other advantages as will be illustrated by the following description and accompanying figures.

SUMMARY OF THE INVENTION

The present invention is embodied in a system and method for the automatic identification of an interface type to which a computer input device is connected. The computer input device, such as a pointing device, generates position data corresponding to user input to the pointing device. The system includes a single sense line coupled between the interface and the pointing device where the sense line has a first voltage level generated by the interface if the interface is of a first type, and has a second voltage level different from the first voltage level generated by the interface if the interface is of a second type. A sensing circuit within the pointing device detects the voltage from the sense line and is in a first output state if the sense line has the first voltage level and a second output state if the sense line has the second voltage level. A processor within the pointing device is coupled to the sensing circuit and processes the position data in a first manner if the sensing circuit is in the first logic state and processes the position data in a second manner if the sensing circuit is in the second state.

The pointing device may be a mouse, trackball, or the like. The system is operable with either a PS/2 or mouse port interface or a RS-232 interface. If the pointing device is coupled to a PS/2 interface, the voltage on the sense line is greater than or equal to 0 volts. If the pointing device is coupled to a serial interface, the voltage on the sense line is less than 0 volts. A formatter formats the position data for transmission to the PS/2 interface, or for serial transmission to the serial interface, depending on the detected interface type.

BRIEF DESCRIPTION OF THE DRAWINGS

FIG. 1 is a functional block diagram illustrating the connection of a conventional PS/2 pointing device to a PS/2 interface.

2

FIG. 2 is a functional block diagram illustrating the connection of a conventional serial pointing device to a serial interface.

Figure 3A:
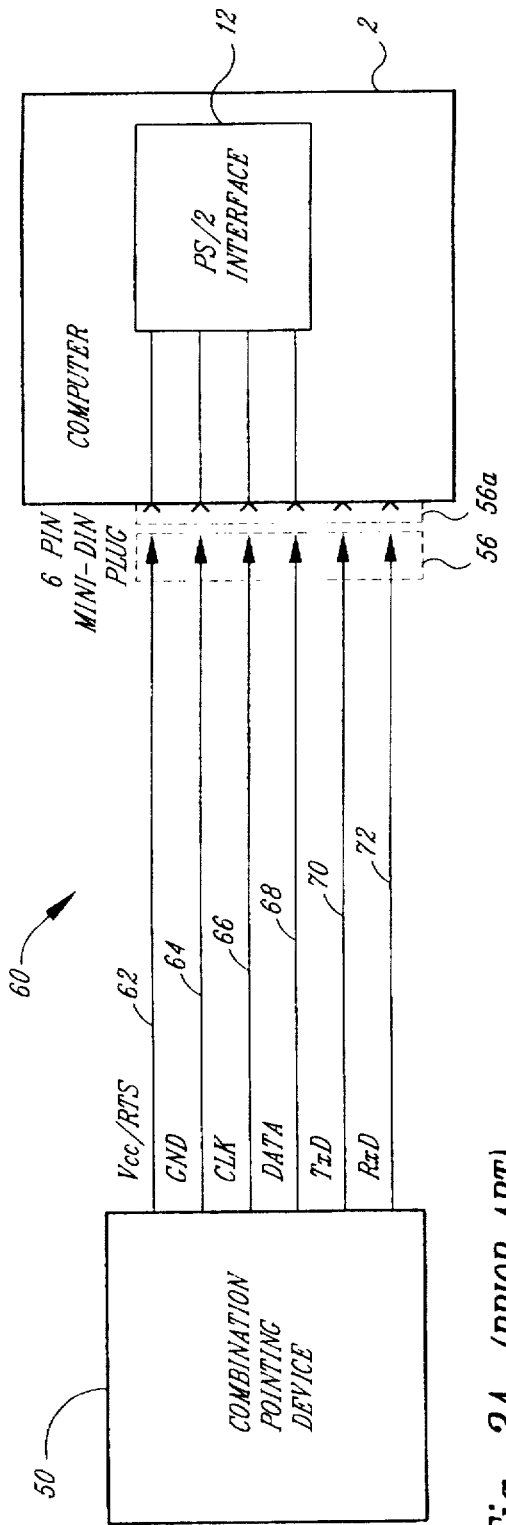

FIG. 3A is a functional block diagram illustrating the connection of a conventional combination pointing device to a parallel interface.

Figure 3B:
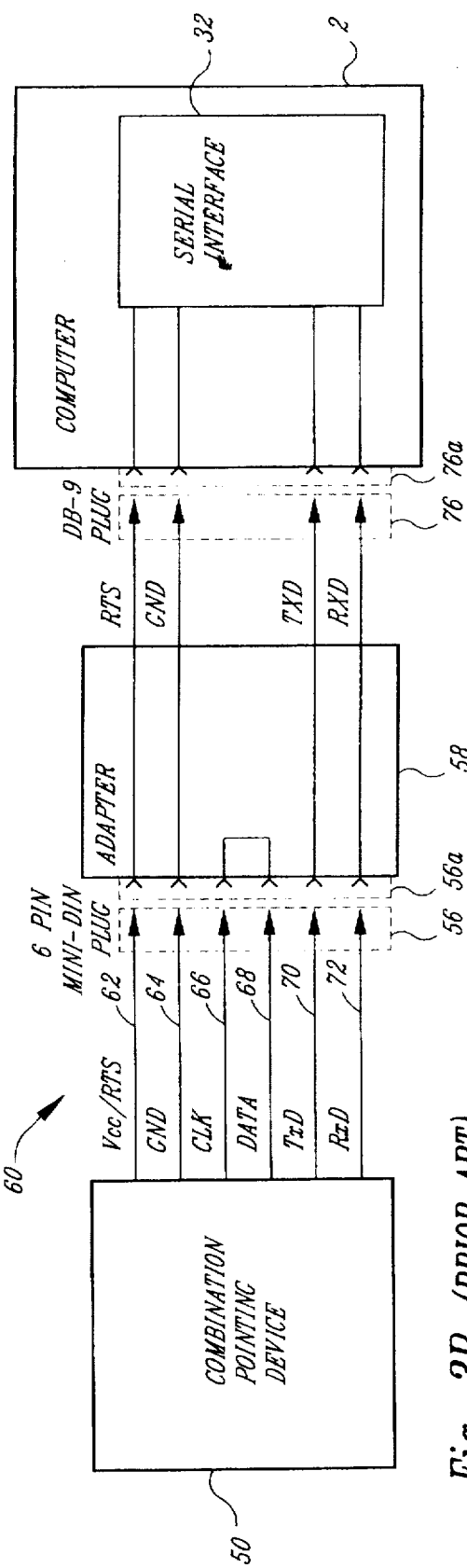

FIG. 3B is a functional block diagram illustrating the connection of the conventional combination pointing device to a serial interface using a conventional adapter.

Figure 4:
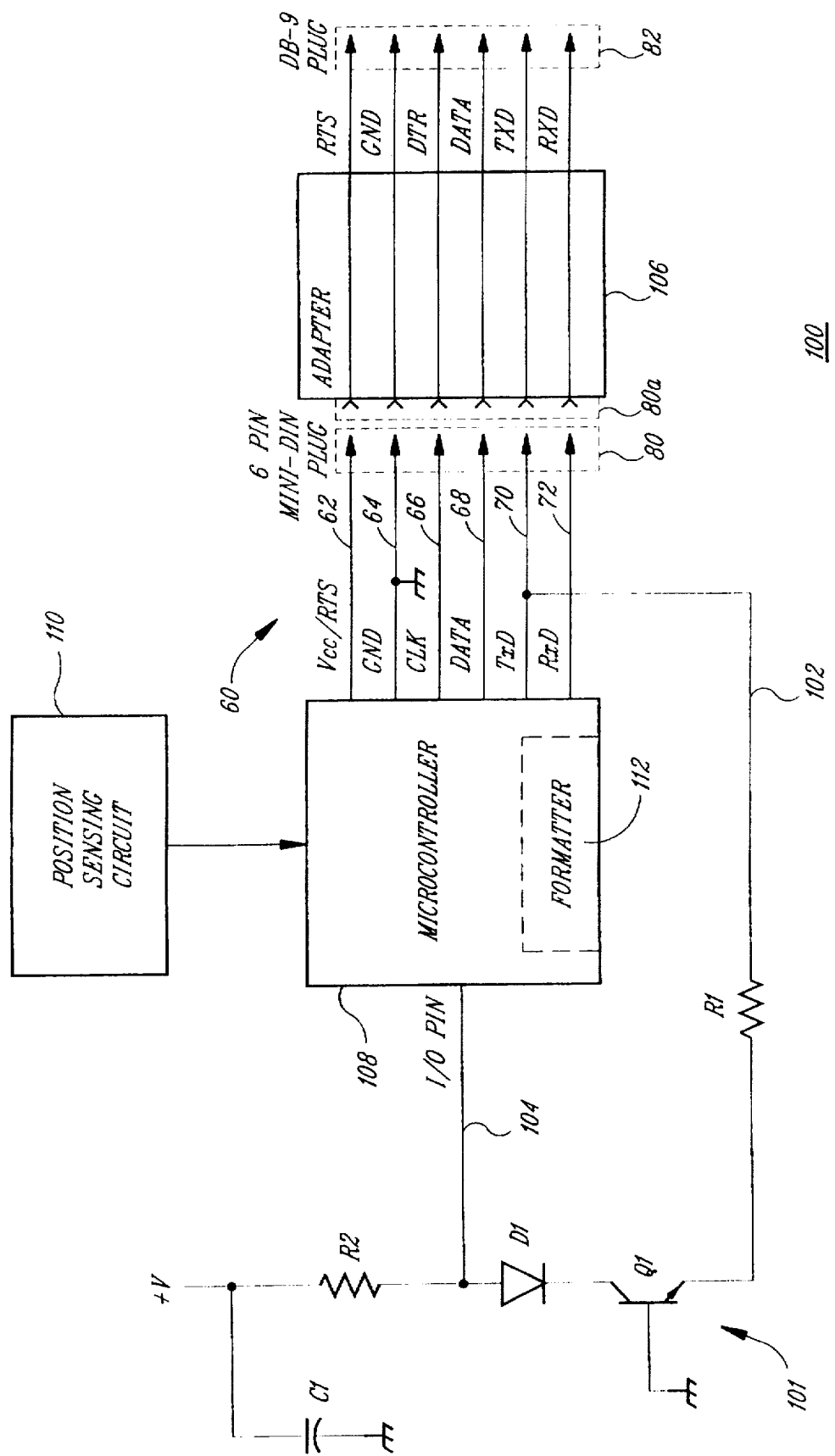

FIG. 4 is a circuit according to the present invention illustrating the sensing circuit operation to determine interface types.

Figure 5:
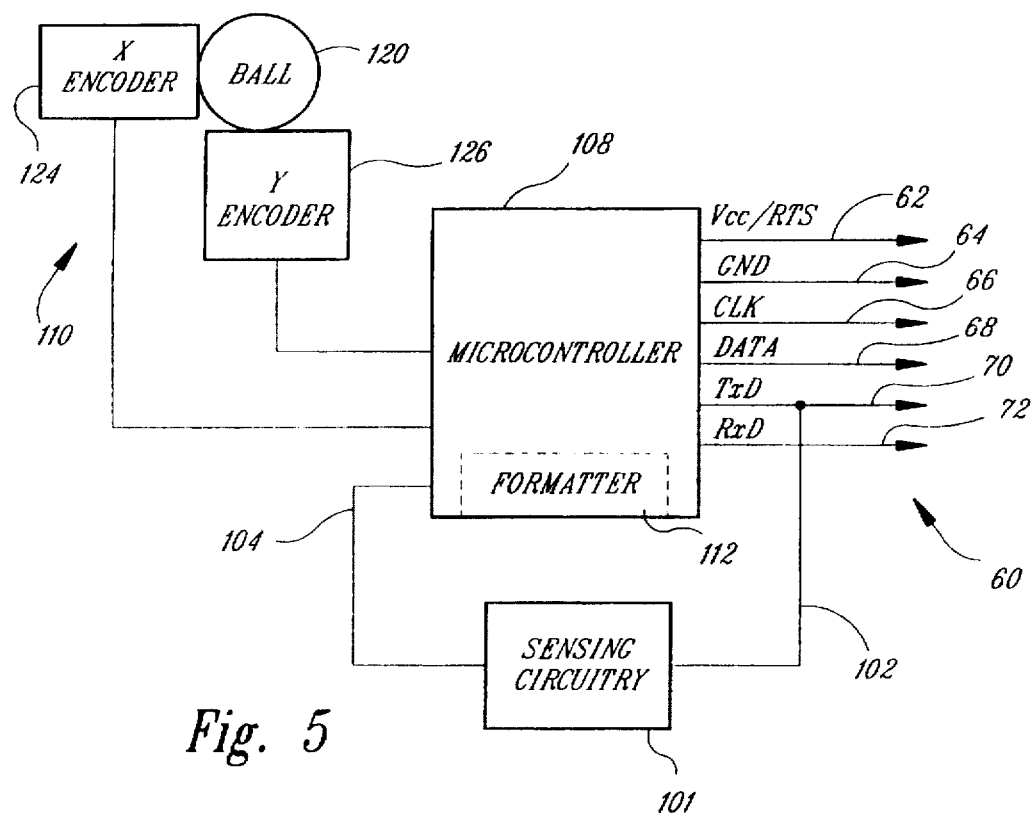

FIG. 5 is a functional block diagram of a combination pointing device incorporating the sensing circuit of FIG. 4.

Figure 6:
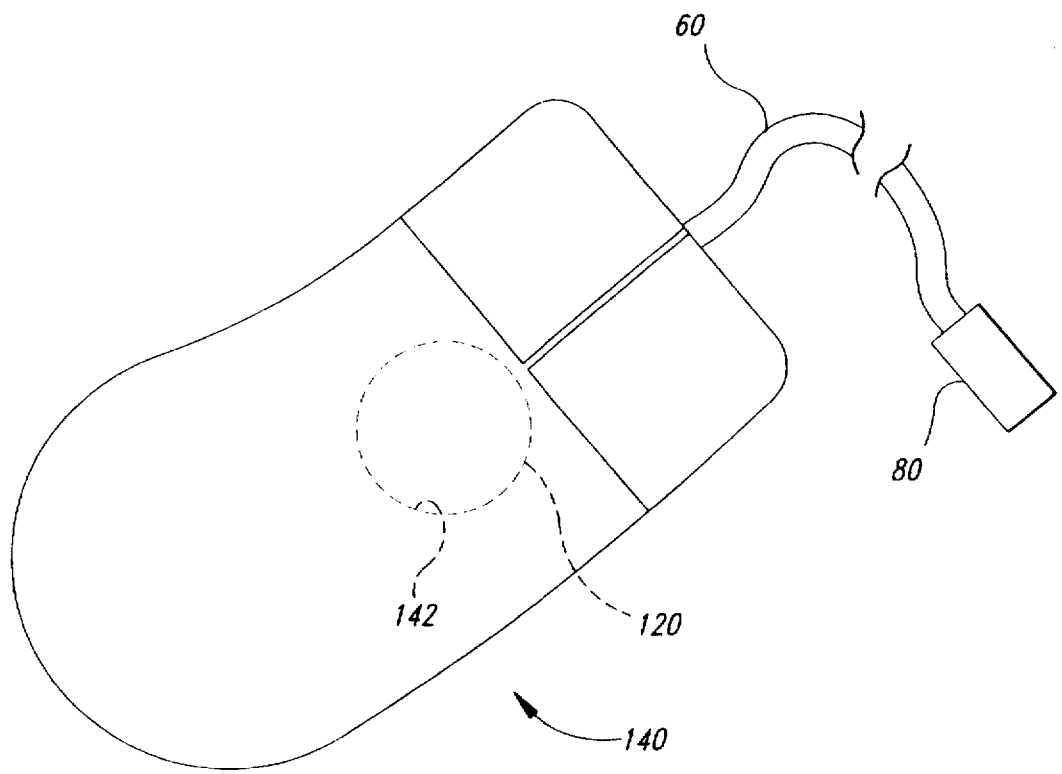

FIG. 6 illustrates a mouse incorporating the sensing circuit of FIG. 4.

Figure 7:
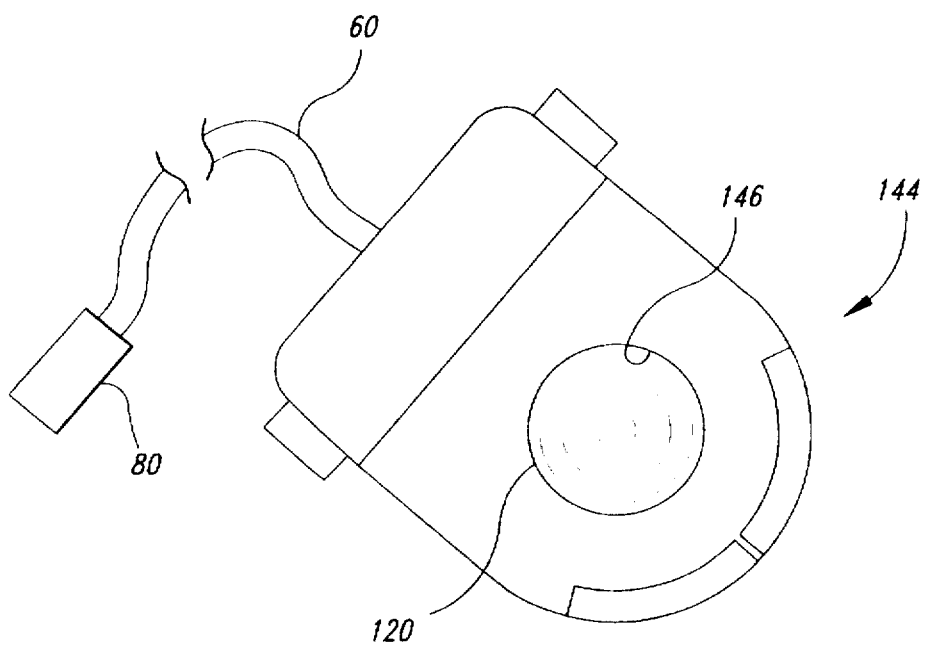

FIG. 7 illustrates a trackball incorporating the sensing circuit of FIG. 4.

Figure 8:
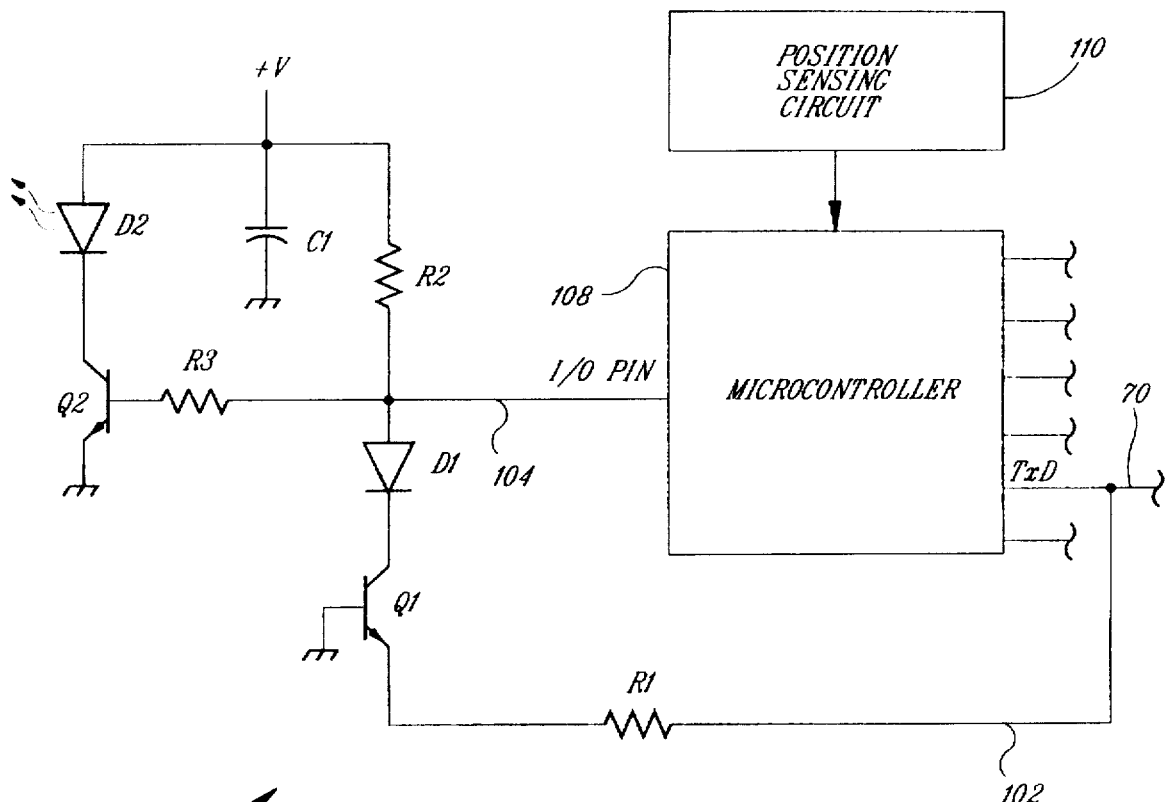

FIG. 8 is an electrical circuit showing the use of the I/O pin in the sensing circuit of FIG. 4 when used for multitasking operations.

DETAILED DESCRIPTION OF THE INVENTION

Different types of computer input devices have been specifically designed to operate with a particular interface within a computer 2, as illustrated in FIG. 1. A PS/2™ pointing device 10 is coupled to a PS/2 interface 12 using a cable 14 and an industry standard six pin mini-DIN plug 16. The term "PS/2" is a trademark of International Business Machines. The six pin mini-DIN plug 16 connects with a corresponding six pin mini-DIN connector 16a on the computer 2. The cable 14 for the parallel pointing device 10 includes a +5 volts DC (VDC) line 18 as well as a ground (GND) line 20. The +5 VDC and ground lines 18 and 20, supply power to the PS/2 pointing device 10. The PS/2 pointing device 10 generates position data as a result of user input to the pointing device. For example, if the PS/2 pointing device 10 is a mouse, the mouse generates position data in response to user movement of the mouse. The position data generated by the PS/2 pointing device 10 as well as data related to the position of one or more buttons (not shown) is transmitted to the PS/2 interface 12 using a clock line 22 and a data line 24. The operation of the PS/2 pointing device 10 is well-known to those skilled in the art and need not be described in greater detailed herein.

Other computer pointing devices include a serial pointing device 30, illustrated in FIG. 2. The serial pointing device 30 is coupled to a serial interface 32, such as an RS-232 interface, within the computer 2 using a cable 34 and an industry standard D-Sub 9 plug 36. The D-Sub 9 plug 36 connects with a corresponding DB-9 connector 36a on the computer 2. The cable 34 includes a "Request to Send" (RTS) line 38. The RTS line 38 is a control line used in a conventional serial port. However, the typical serial pointing device 30 does not use such a control line. Instead, the RTS line 38 is used to supply a positive voltage to the serial pointing device 30. The positive voltage supplied to the serial pointing device typically ranges from +5 VDC to +12 VDC.

The cable 34 also includes a ground (GND) line 42, which is used by the serial interface 32 in supplying power to the serial pointing device 30 along with the supply voltages. The cable 34 also includes a TxD) data line 46 and a RxD data line 48. The TxD data line 46 typically carries data from the serial interface 32 to a peripheral. However, the conventional serial pointing device 30 is a send only device, and does not receive data on the TxD data line 46. Rather, the TxD data line 46 is used to carry a negative voltage required by the serial interface 32. The negative voltage typically ranges from −5 VDC to −12 VDC. The serial pointing device 30 transmits data to the serial interface 32 using the RxD data line 48. Data transmitted from the serial pointing device 30 includes positional data as well as data related to the position of one or more buttons (not shown) on the serial pointing device. The operation of the serial pointing device 30 is well known in the art and need not be described in any greater detail herein.

A conventional combination pointing device 50 is illustrated in FIGS. 3A and 3B. The combination pointing device 50 has circuitry (not shown) that allows it to function as either the PS/2 pointing device 10 (see FIG. 1) or the serial pointing device 30 (see FIG. 2). The user can connect the combination pointing device 50 directly to the PS/2 interface 12 using a conventional six pin mini-DIN plug 56, as illustrated in FIG. 3A. The six pin mini-DIN plug 56 connects with a corresponding six pin mini-DIN connector 56a on the computer 2. The combination pointing device 50 includes a six conductor cable 60 that contains wires for use with either the PS/2 interface 12 or the serial interface 32.

When the combination pointing device 50 is coupled to the PS/2 interface 12, there are four wires within the cable 60 that are required for proper operation with the combination pointing device. A $V_{cc}$/RTS line 62 provides power to the combination pointing device 50 from the PS/2 interface 12. As will be discussed below, the $V_{cc}$/RTS line 62 is used by the combination pointing device 50 when coupled to either the PS/2 interface 12 or the serial interface 32 (see FIG. 3B). A ground (GND) line 64 also is used in supplying power from the PS/2 interface 12 to the combination pointing device 50. A clock (CLK) line 66 carries a clock signal generated by the combination pointing device 50 to synchronize the transfer of data to the PS/2 interface 12. A data line 68 is used in conjunction with the CLK line 66 to transfer data from the combination pointing device 50 to the PS/2 interface 12. The data carried by the data line 68 includes both positional data and data related to the position of one or more buttons (not shown) on the combination pointing device 50. In addition, the cable 60 includes a TxD line 70 and an RxD line 72. While the TxD line 70 and the RxD line 72 are included in the cable 60, they are not used when the combination pointing device 50 is coupled to the PS/2 interface 12. However, as will be discussed below, the TxD line 70 and RxD line 72 are used when the combination pointing device 50 is coupled to the serial interface 32.

If the user wishes to use the combination pointing device 50 with the serial interface 32, an adapter 58 is used to couple the combination pointing device 50 to the serial interface 32 as shown in FIG. 3B. The adapter 58 includes a six pin mini-DIN connector 56a and a D-Sub 9 plug 76. The six pin mini-DIN plug 56 on the combination pointing device 50 connects to the six pin mini-DIN connector 56a of the adapter 58, while the DB-9 plug 76 of the adapter connects to a corresponding DB-9 connector 76a on the computer 2.

As previously discussed, the TxD line 70 and RxD line 72 are used by the combination pointing device 50 when connected to the serial interface 32 using the adapter 58. In addition to the TxD line 70 and the RxD line 72, the adapter 58 connects the $V_{cc}$/RTS line 62 and the GND line 64 to the serial interface 32. It should be noted that, in some cases, a serial version of the combination pointing device is provided by the manufacturer with the DB-9 plug 76 for direct connection to the serial interface 32. In this situation, an adapter (not shown) is provided to convert the DB-9 plug 76 on the serial version of the combination pointing device 50 to the six pin mini-DIN plug 56 for operation with the PS/2 interface 12. The DB-9 plug 76 to six pin mini-DIN plug 56 adapter (not shown) connects the same wires to the parallel interface, as previously discussed with respect to FIG. 3A. Similarly, the serial version of the combination pointing device 50 with the DB-9 plug 76, which is not illustrated herein, connects the lines of the cable 60 in the manner discussed above with respect to FIG. 3B directly to the serial interface 32 without the need for the adapter 58. However, the combination pointing device 50, and the data signals connected thereto, are used in the manner previously discussed.

As discussed above, the combination pointing device 50 has circuitry to allow it to operate with the PS/2 interface 12 (see FIG. 3A) or with the serial interface 32 (see FIG. 3B). For proper operation, electrical circuitry (not shown) in the combination pointing device must determine whether the combination pointing device 50 is coupled to the PS/2 interface 12 or to the serial interface 32. The combination pointing device 50 uses lines within the adapter 58 to determine whether the adapter is used or not. Specifically, the CLK line 66 is shorted to the data line 68 within the adapter 58. The circuitry in the combination pointing device 50 sends a signal out on the CLK line 66 and examines the data line 68 to determine whether they are connected or not. If the CLK line 66 and the data line 68 are connected, the combination pointing device 50 interprets this as an indication that the combination pointing device is coupled to the serial interface 32. Accordingly, the circuitry in the combination pointing device 50 formats the data for transmission to the serial interface 32. If the CLK line 66 and the data line 68 are not coupled together, the circuitry in the combination pointing device 50 interprets this as an indication that the combination pointing device is coupled to the PS/2 interface 12. Accordingly, the circuitry in the combination pointing device 50 formats the data for transmission to the PS/2 interface 12.

The drawback of the prior art system illustrated in FIGS. 3A and 3B is that the CLK line 66 and the data line 68 must be shorted together within the adapter 58. Because the CLK line 66 and the data line 68 are shorted together, these lines are not available for other purposes. As discussed above, some of the lines within the cable 60 are used to carry power to the combination pointing device 50. For example, the TxD line 70 carries negative power from the serial interface 32 to the combination pointing device 50. Similarly, the $V_{cc}$/RTS line 62 carries power to the combination pointing device from both the PS/2 interface 12 (see FIG. 3A) and the serial interface 32 (see FIG. 3B). The data lines discussed above are capable of carrying only a limited amount of current to the combination pointing device 50. The inability to use the CLK line 66 and the data line 68 limits the amount of electrical current that can be supplied to the combination pointing device 50 by the serial interface 32. In certain circumstances, the combination pointing device 50 may include additional circuitry that requires current that exceeds the supply capacity of the lines in the cable 60 that supply power to the combination pointing device 50 from the serial interface 32.

The present invention uses only a single wire within the cable 60 to determine whether the combination pointing device 50 is coupled to the PS/2 interface 12 or the serial interface 32. This permits the use of additional lines within the cable 60 to supply current to the combination pointing device 50. The present invention is embodied in a combination pointing device 100 illustrated in FIG. 4. Electrical sending circuitry 101 within the pointing device 100 senses whether the pointing device is coupled to the PS/2 interface 12 (see FIG. 3A) or the serial interface 32 (see FIG. 3B). A transistor $Q_1$, of the NPN type, has its base tied to circuit ground (i.e., GND). The emitter of the transistor $Q_1$ is coupled through a resistor $R_1$ to a sense line 102. The collector of the transistor $Q_1$ is tied through a diode $D_1$ to an I/O pin 104 on a microcontroller or microprocessor 108. A motion sensing circuit 110 provides movement data to the microcontroller 108. The operation of the motion sensing circuit 110 will be discussed below. In addition to the movement data, the combination pointing device generates switch data corresponding to the position of one or more switches (not shown). The movement data and switch data is generically referred to herein as data. Those skilled in the art understand that this term includes both movement and switch data.

The I/O pin 104 on the microcontroller 108 is tied to a positive supply voltage +V through a pull-up resistor $R_2$. A filter capacitor $C_1$ connected between positive supply voltage +V and circuit ground is also included to provide a more stable voltage and eliminate noise. The pointing device 100 may be coupled to either the conventional PS/2 interface 12 (see FIG. 3A) or the serial interface 32 (see FIG. 3B). As those skilled in the art can appreciate, the positive supply voltage +V is provided by the PS/2 interface 12 or the serial interface 32. If the pointing device 100 is coupled to the PS/2 interface 12, the positive supply voltage +V is +5 VDC. However, if the pointing device 100 is coupled to the serial interface 32, the positive supply voltage +V can be anywhere between +5 VDC and +12 VDC depending on the voltages supplied by the serial interface.

The sense line 102 is used to automatically determine whether the pointing device 100 is coupled to the PS/2 interface 12 or the serial interface 32. The advantage of the present invention is that it eliminates the need for the CLK line 66 and the data line 68 to be shorted together in the adapter 58 (see FIG. 3B) to provide an indication that the combination pointing device is coupled to the serial interface 32. The use of the single sense line 102 allows one of the two wires previously shorted together in the prior art adapter 58 to be used for other purposes, as will be discussed below. If the sense line 102 is coupled to the PS/2 interface 12, the sense line will have a voltage level between 0 VDC and +5 VDC. Under such circumstances, transistor $Q_1$ is not turned on, and the pull-up resistor $R_2$ causes a high logic level to appear on the I/O pin 104. The microcontroller 108 interprets the high voltage level on the I/O pin 104 as an input to indicate that the pointing device 100 is connected to the PS/2 interface 12. A formatter 112 within the microcontroller 108 subsequently configures the data for transmission to the PS/2 interface 12 in a conventional manner.

The present invention also includes an adapter 106, which has a six pin mini-DIN connector 80a corresponding to a six pin mini-DIN plug 80 on the pointing device 100 and a DB-9 plug 82 to connect to the DB-9 connector 76a on the computer 2 with the connector 76a (see FIG. 3B) of the serial interface 32. The adapter 106 is similar to the conventional adapter 58 except the clock line 66 and the data line 68 are not shorted together in the adapter 106. As will be discussed in detail below, the sensing circuitry 101 detects the connection of the pointing device 100 to the serial interface 32 using the TxD line 70. Thus, the present invention does not require shorting together of pins in the adapter 106. This permits both the CLK line 66 and the data line 68 to be used for other purposes when the pointing device 100 is connected to the serial interface 32.

If the pointing device 100 is coupled to the serial interface 32, the sense line 102 will be at a voltage between −5VDC and −12VDC depending on the particular voltages used in the serial interface. The minus voltage on the sense line 102 causes the transistor $Q_1$ to turn on, thus pulling the I/O pin 104 to a low logic level. The microcontroller 108 interprets the low logic level on the I/O pin 104 as an indication that the pointing device 100 is connected to the serial interface 32. The formatter 112 within the microcontroller 108 formats the data for transmission to the serial interface 32 in a conventional manner. The precise manner in which the data is encoded for transmission to the PS/2 interface 12 or the serial interface 32 is well known in the art and will not be described herein.

The advantage of the circuitry 101 is that only a single line (i.e., the sense line 102) is used to sense whether the pointing device 100 is coupled to the PS/2 interface 12 or the serial interface 32. The values of the resistors $R_1$ and $R_2$ are selected so that the transistor $Q_1$ is saturated when the sense line 102 is at a −5VDC to −12VDC level. While in saturation, the collector of the transistor $Q_1$ is approximately a diode drop below ground. The diode $D_1$ serves to assure that the voltage on the I/O pin 104 does not go below ground. In the presently preferred embodiment, the sense line 102 is coupled to the TxD line 70. As described with respect to FIG. 3A, the TxD line 70 is not used by the PS/2 interface 12. Therefore, the sense line 102 is floating when the pointing device 100 is connected to the PS/2 interface 12. The sense line 102 will float between 0VDC and +5VDC, which will prevent the transistor $Q_1$ from turning on, as discussed above. When the pointing device is coupled to the serial interface 32, the TxD line 70 will be between −5VDC and −12VDC thus causing the transmission $Q_1$ to turn on.

Because the TxD line 70 is used to sense the connection to the PS/2 interface 12 or the serial interface 32, the CLK line 66 and data line 68 do not need to be shorted together in the adapter 106 as required in the prior art adapter 58. This allows the CLK line 66 and data line 68 to be used for purposes other than sensing whether the combination pointing device is connected to the PS/2 interface 12 or the serial interface 32. For example, the CLK line 66 or the data line 68 may be used to supply additional current to the combination pointing device 50.

In the presently preferred embodiment, the sensing circuitry 101 is incorporated into the pointing device 100. The microcontroller 108 is used to calculate the movement data of the pointing device 100 in addition to sensing the interface type and formatting the data.

The motion sensing circuit 110 used by the pointing device 100 is illustrated in the functional block diagram of FIG. 5. The example in FIG. 5 illustrates the operation of the pointing device 100 as a mouse or a trackball. As those skilled in the art will readily appreciate, the operation of a mouse and trackball are similar. FIG. 6 illustrated a mouse 140 incorporating the sensing circuit 101. The ball 120 projects downward through an aperture 142 in a bottom portion of the mouse 140 and rotates as the user moves the mouse.

FIG. 7 illustrates a trackball 144 incorporating the sensing circuitry 101. The ball 120 projects upward through an aperture 146 in an upper portion of the trackball 144 and is directly manipulated by the user. The operation of the mouse 140 and the trackball 144 are well known in the art and need not be described in further detail herein. Those skilled in the art will also appreciate that the pointing device 100 may be a joystick, game pad, or the like. The present invention is not limited to the specific form of the pointing device 100.

Returning again to FIG. 5, the motion sensing circuit 110 detects the rotational movement of a ball 120, rotatable by a user. An X encoder 124 and a Y encoder 126 are used to detect the rotational movement of the ball 120. The X encoder 124 and Y encoder 126 are orthogonally positioned with respect to each other so that the rotational movement of the ball 120 is detected in two orthogonal directions, designated herein as the X direction and the Y direction, respectively. The rotation of the ball 120 in the X direction is detected by the X encoder 124, while the rotation of the ball 120 in the Y direction is detected by the Y encoder 126. The X encoder 124 and the Y encoder 126 use optocouplers (not shown) to sense the rotation of the ball 120. The use of optocouplers in the position sensing circuit 110 is well known in the art, and need not be described in detail herein.

The data generated by the X encoder 124 and the Y encoder 126 is transferred to the microcontroller 108. The microcontroller 108 uses the data to determine the rotational movement of the ball 120. As discussed above, the microcontroller 108 also determines whether the pointing device 100 is coupled to the PS/2 interface 12 or the serial interface 32. The formatter 112 formats the data corresponding to the rotational movement of the ball 120 into the proper format for transmission to either the PS/2 interface 12 or the serial interface 32.

As those skilled in the art can appreciate, the cost of the microcontroller 108 is directly proportional to the number of pins required on the microcontroller integrated circuit itself. Therefore, it is desirable to use the pins for multiple functions whenever possible. The present invention permits the use of the I/O pin 104 for multitasking, thus reducing the number of pins and the overall cost of the microcontroller 108. This aspect of the invention is illustrated in FIG. 8 where a second transistor $Q_2$, of the NPN-type, has its base coupled to the I/O pin 104 through a resistor $R_3$. The emitter of the transistor $Q_2$ is coupled to circuit ground. The collector of the transistor $Q_2$ is coupled to a light emitting diode $D_2$, which is part of an optocoupler in the position sensing circuit 110 (see FIG. 4). The operation of optocouplers in the pointing device 100 are well known, and will not be described herein.

The microcontroller 108 generates a pulse train at the I/O pin 104 to periodically activate the transistor $Q_2$, which, in turn, activates the light emitting diode $D_2$, thus minimizing the overall use of power in the position sensing circuit 110. The transistor $Q_2$ acts, in effect, as a strobe line for the light emitting diode $D_2$. The use of such strobe lines to conserve power in the position sensing circuit 110 is well known in the art, and will not be described herein. Furthermore, the strobing function of transistor $Q_2$ in FIG. 8 is merely an example of the multitasking operations that can be performed by the I/O pin 104. The present invention is directed to the multitasking ability of the I/O pin 104 and is not limited by the specific application to which the multitasking capabilities are applied.

The transistor $Q_2$ can operate whether the pointing device 100 is connected to the PS/2 interface 12 or the serial interface 32. As previously described, the transistor $Q_1$ is turned off when the pointing device 100 is coupled to the PS/2 interface 12. The resistors $R_2$ and $R_3$ are selected to allow the transistor $Q_2$ to be turned on by a high logic level generated by the microcontroller 108 at the I/O pin 104 and turned of by a low logic level at the I/O pin. The transistor $Q_1$ is turned on when the pointing device 100 is coupled to the serial interface 32. In such circumstances, the microcontroller 108 can generate sufficient current drive capacity at the I/O pin 104 to turn on the transistor $Q_2$. Thus, the I/O pin 104 can be used for multitasking operations regardless of the interface type to which the pointing device 100 is connected.

The sensing circuitry 101 is operational whenever the pointing device 100 is connected to the PS/2 interface 12 or the serial interface 32.

However, the microcontroller 108 need only check the interface type when the computer 2 (see FIGS. 3A and 3B) is initially powered up or reset. When the microcontroller 108 determines the type of interface to which the pointing device 100 is connected, the formatter 112 formats the data for transmission to the appropriate interface type. This interface type will not change during normal operation of the computer 2. If the user disconnects the pointing device 100 and reconnects it to an interface of a different type, the computer 2 must undergo a hardware reset procedure or require the user to manually intervene to add a new hardware description. For example, the user can disconnect the pointing device 100 from the PS/2 interface 12 and reconnect the pointing device to the serial interface 32 using the adapter 106. Typically, such a change of interface type is done when the computer is turned off. Thus, the I/O pin 104 can be used for the multitasking functions described above immediately following the power up or hardware reset procedures.

Thus, the sensing circuitry 101 provides a simple detection technique for determining the interface type to which the combination pointing device 110 is connected. This technique uses only a single sense line 102, which permits other wires within the cable previously used to determine the interface type to be used for other purposes, such as carrying additional power.

Those skilled in the art will recognize that the principles of the present invention may be readily applied to other computer input devices, such as keyboards, joysticks, and the like, where the data entry device can be coupled to different interface types. While the interface examples presented herein are the PS/2 and RS-232 serial interfaces, those skilled in the art will readily recognize that the present invention is applicable to other interface types, such as the Universal Serial Bus.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A system, used in a computer pointing device generating movement data, for the automatic identification of an interface type of a pointing device interface, the system comprising:

a sense line coupled between the interface and the pointing device, said sense line having a first voltage level generated by the interlace if the interface is a first interface type and a second voltage level, different from said first voltage level, generated by the interface if the interface is a second interface type;

a transistor having a first terminal coupled to said sense line, said transistor having a second terminal in a first output state if said sense line is at said first voltage level and in a second output state if said sense line is at said second voltage level; and a processor coupled to said transistor second terminal and processing the movement data in a first manner if said second terminal is in said first output state and processing the movement data in a second manner if said second terminal is in said second output state.

2. The system of claim 1 wherein said transistor is turned on if said sense line is at said first voltage level and turned off if said sense line is at said second voltage level.

3. The system of claim 1 wherein said second terminal is coupled to a processor data line, the system further including a first resistance and a diode, said first resistance coupling said power supply line to the processor data line and said diode coupling the processor data line to said second terminal.

4. The system of claim 1 wherein said second terminal is coupled to a processor data line functioning as a data input line and said processor selectively generates output data on the processor data line, whereby the processor data line functions both as said input data line to said processor and an output data line from said processor.

5. The system of claim 1 wherein said second terminal is coupled to a processor data line functioning as a data input line, the system further including a peripheral data circuit coupled to the processor data line to receive output data generated by said processor and to respond to said output data, whereby the processor data line functions both as said input data line to said processor and an output data line from said processor.

6. The system of claim 5 wherein said peripheral data circuit includes a light emitting diode as part of an optical circuit to generate the movement data, said light emitting diode being coupled to the processor data line and said output data is a light emitting diode control signal to control said light emitting diode.

7. The system of claim 6, further including a control transistor coupled to said light emitting diode and to the processor data line to receive said light emitting diode control signal and in response thereto control said light emitting diode.

8. The system of claim 1 wherein the pointing device is a mouse and said processor processes the movement data generated by the mouse.

9. The system of claim 1 wherein the pointing device is a trackball and said processor processes the movement data generated by the trackball.

10. The system of claim 1 wherein said first interface type is a serial interface and generates a negative voltage coupled to said sense line as said first voltage level, said transistor being activated by said negative voltage.

11. The system of claim 1 wherein said first interface type is a serial interface, said processor further including a formatter to format the movement data as serial movement data and serially transmit the serial movement data to the interface.

12. The system of claim 1 wherein said second interface type is a PS/2 interface and generates a voltage greater than or equal to zero volts coupled said sense line as said second voltage level, said transistor being deactivated by said second voltage level.

13. The system of claim 1 wherein said second interface type is a PS/2 interlace, said processor further including a formatter to format the movement data as PS/2 movement data and transmit the PS/2 movement data to the interface.

14. A computer data entry device capable of the automatic identification of an interface type, for use with a pointing device interface generating a first voltage level if the interface is a first interface type and a generating second voltage level different from the first voltage level if the interface is a second interface type, the computer data entry device comprising:

a position sensing circuit generating positional data in response to user manipulation of the data entry device; and a transistor coupled to the interface to sense the voltage generated by the interface, said transistor having an output terminal to produce an output voltage having a first output level if the interface is generating the first voltage level and a second output level if the interface is generating the second voltage level; and a processor coupled to said transistor output terminal to sense said output voltage levels, said processor processing said positional data in a first manner if the interface is generating the first voltage level and processing said positional data in a second manner if the interface is generating the second voltage level.

15. The system of claim 14, wherein the transistor has an input terminal connected to the interface to have the first and second voltage levels applied thereto, said transistor output terminal producing said first output level in response to sensing the first voltage level applied to said input terminal and producing said second output level in response to sensing the second voltage level applied to said input terminal.

16. The pointing device of claim 15 wherein said transistor includes a third terminal coupled to a first reference voltage.

17. The pointing device of claim 16 wherein said transistor output terminal is coupled to said processor by a diode.

18. The pointing device of claim 17 wherein said diode is coupled to a positive reference voltage by a resistor.

19. The system of claim 14 wherein said transistor output terminal is coupled to a processor data line functioning as a data input line and said processor selectively generates output data on the processor data line, whereby the processor data line functions both as said input data line to said processor and an output data line from said processor.

20. The system of claim 14 wherein said transistor output terminal is coupled to a processor data line functioning as a data input line, the system further including a peripheral data circuit coupled to the processor data line to receive output data generated by said processor and to respond to said output data, whereby the processor data line functions both as said input data line to said processor and an output data line from said processor.

21. The system of claim 20 wherein said peripheral data circuit includes a light emitting diode as part of an optical circuit to generate said positional data, said light emitting diode being coupled to the processor data line and said output data is a light emitting diode control signal to control said light emitting diode.

22. The system of claim 21, further including a control transistor coupled to said light emitting diode and to the processor data line to receive said light emitting diode control signal and in response thereto control said light emitting diode.

23. The system of claim 14 wherein the pointing device is a mouse and said processor processes said positional data generated by the mouse.

24. The system of claim 14 wherein the pointing device is a trackball and said processor processes said positional data generated by the trackball.

25. The system of claim 14 wherein the first interface type is a serial interface and generates a negative voltage coupled to said transistor as the first voltage level, said processor processing said positional data in said first manner in response to said negative voltage.

26. The system of claim 14 wherein the first interface type is a serial interface, said processor further including a formatter to format the positional data as serial positional data and serially transmit the serial positional data to the interface.

27. The system of claim 14 wherein said second interface type is a PS/2 interface and generates a voltage greater than or equal to zero volts coupled said transistor as the second voltage level, said processor processing said positional data in said second manner in response to said voltage greater than or equal to zero volts.

28. The system of claim 14 wherein the second interface type is a PS/2 interface, said processor further including a formatter to format the positional data as PS/2 positional data and transmit the PS/2 positional data to the interface.

29. A method for use with a computer data entry device for the automatic identification of a data entry device interface type, the interface generating a first voltage level if the interface is a first interface type and a generating second voltage level different from the first voltage level if the interface is a second interface, the method comprising the steps of:

generating positional data in response to user manipulation of the data entry device;

sensing the voltage generated by the interface using a transistor coupled to the interface, and processing said positional data in a first manner if said sensed voltage on said transistor is the first voltage level and processing said positional data in a second manner if said sensed voltage on said transistor is the second voltage level.

30. The method of claim 29 wherein said transistor is coupled to a processor having a data line functioning as a data input line for said step of sensing the voltage generated by the interface, the method further including the step of selectively generating output data on said data line, whereby said processor data line functions both as said input data line to said processor and an output data line from said processor.

31. The method of claim 29 wherein said transistor is coupled to a processor having a data line functioning as a data input line for said step of sensing the voltage generated by the interface, the method further including the step of coupling a peripheral data circuit to said data line to receive output data generated by said processor and to respond to said output data, whereby said data line functions both as said input data line to said processor and an output data line from said processor.

32. The method of claim 31 wherein said peripheral data circuit includes a light emitting diode as part of an optical circuit for said step of generating said positional data, said light emitting diode being coupled to the data line and said output data is a light emitting diode control signal to control said light emitting diode.

33. The method of claim 29 wherein the first interface type is a serial interface and generates a negative voltage coupled to said transistor as the first voltage level, said step of processing said positional data processing in said first manner in response to said negative voltage.

34. The method of claim 29 wherein the first interface type is a serial interface and said step of processing includes formatting said positional data as serial positional data and serially transmitting said serial positional data to the interface.

35. The method of claim 29 wherein said second interface type is a PS/2 interface and generates a voltage greater than or equal to zero volts coupled said transistor as the second voltage level, said step of processing said positional data processing in said second manner in response to said voltage greater than or equal to zero volts.

36. The method of claim 29 wherein the second interface type is a PS/2 interface and said step of processing includes formatting said positional data as PS/2 positional data and transmitting said PS/2 positional data to the interface.

* * * * *